United States Patent
Bouanba et al.

(10) Patent No.: US 10,992,380 B2
(45) Date of Patent: Apr. 27, 2021

(54) WIRELESS OPTICAL COMMUNICATION SYSTEM BETWEEN A ROTATING ELEMENT AND A FIXED ELEMENT

(71) Applicants: MERSEN FRANCE AMIENS SAS, Amiens (FR); UNIVERSITÉ DE PICARDIE JULES VERNE, Amiens (FR)

(72) Inventors: Yacine Bouanba, Harly (FR); Radjy Ramlall, Lomme (FR); Jérôme Dubois, Saint-Quentin (FR); Aurélien Lorthois, Nauroy (FR); Valéry Bourny, Amiens (FR)

(73) Assignees: MERSEN FRANCE AMIENS SAS, Amiens (FR); UNIVERSITÉ DE PICARDIE JULES VERNE, Amiens (FR)

( * ) Notice: Subject to any disclaimer, the term of this patent is extended or adjusted under 35 U.S.C. 154(b) by 0 days.

(21) Appl. No.: 16/628,441

(22) PCT Filed: Jul. 3, 2018

(86) PCT No.: PCT/FR2018/051646
§ 371 (c)(1),
(2) Date: Jan. 3, 2020

(87) PCT Pub. No.: WO2019/008263
PCT Pub. Date: Jan. 10, 2019

(65) Prior Publication Data
US 2020/0162161 A1 May 21, 2020

(30) Foreign Application Priority Data
Jul. 3, 2017 (FR) ...................................... 1756256

(51) Int. Cl.
*H04B 10/114* (2013.01)
*F03D 80/00* (2016.01)
(Continued)

(52) U.S. Cl.
CPC ......... *H04B 10/1143* (2013.01); *F03D 80/00* (2016.05); *H04B 10/50* (2013.01); *H04B 10/66* (2013.01)

(58) Field of Classification Search
None
See application file for complete search history.

(56) References Cited

U.S. PATENT DOCUMENTS 9,593,671 B2    3/2017  Astier et al.
2007/0237521 A1* 10/2007 Meyer ............... H04B 10/07955
                                                        398/19

(Continued)

FOREIGN PATENT DOCUMENTS

WO    2015004736 A1    1/2015
WO    2015079176 A1    6/2015

(Continued)

OTHER PUBLICATIONS

International Search Report, dated Sep. 5, 2018, from corresponding PCT application No. PCT/FR2018/051646.

*Primary Examiner* — David W Lambert
(74) *Attorney, Agent, or Firm* — Nixon & Vanderhye (57) ABSTRACT

A system for transferring data between a rotating element and a fixed element by wireless optical communication, including a plurality of rotating optical transmitters distributed in a ring around the turning element and solidly attached to the rotating element, and at least one fixed optical receiver mounted on and solidly attached to the fixed element, arranged at the same height as the plurality of rotating optical transmitters in which the rotating optical (Continued)

transmitters simultaneously transmit a same optical signal, independently of the angular position of the rotating element and are sufficiently numerous such that regardless of the angular position of the rotating element, the fixed optical receiver receives an optical signal.

21 Claims, 5 Drawing Sheets

(51) Int. Cl.
    *H04B 10/50*     (2013.01)
    *H04B 10/66*     (2013.01)

(56) References Cited

U.S. PATENT DOCUMENTS

| | | | | |
|---|---|---|---|---|
| 2009/0160365 A1* | 6/2009 | Niemitalo | ............ | H04B 10/116 315/294 |
| 2014/0376914 A1* | 12/2014 | Miniscalco | ........ | H04B 7/18504 398/58 |
| 2015/0349884 A1* | 12/2015 | Bialic | .................. | H04B 10/116 398/118 |
| 2017/0104834 A1* | 4/2017 | Huang | ................ | H04L 12/6418 |

FOREIGN PATENT DOCUMENTS

WO         2015107686 A1     7/2015
WO     WO-2015107686 A1 *     7/2015   ........... H04B 10/808

\* cited by examiner

WIRELESS OPTICAL COMMUNICATION SYSTEM BETWEEN A ROTATING ELEMENT AND A FIXED ELEMENT

BACKGROUND OF THE INVENTION

Field of the Invention

The invention relates to the transfer of data between a rotating element and a fixed element. A data transfer system, commonly called a "slip ring", provides the transmission of electrical signals between a rotating element and a fixed element in this system.

Description of the Related Art

Conventionally, a sliding contact makes it possible to provide transmission of electrical signals between the rotating element and the fixed element without conversion of the electrical signals. A transmission device may for example comprise one or more collecting rings and one or more respective contact elements, often designated by the term rubbing contact, for example brushes, wires, fibres or the like, disposed so as to rub against the collecting ring or rings.

An electrical rotary joint may for example allow the transfer of measurement data issuing from sensors secured to the rotating element, to a processor secured to the fixed part, and/or instructions issuing from a processor secured to the fixed part and intended for an actuator secured to the rotating part.

The invention can find an application for example in communications between an element secured to a wind-turbine shaft and an element secured to a nacelle. The invention is in no way limited to this application: for example, the invention may find an application in aeronautics, in aerospace, robotics, electricity production, and in industry more generally.

In the case of a wind turbine, the data transfer may in particular take place between sensors installed on a moving part of the nacelle, for example the nose of the wind-turbine nacelle, and a monitor comprising at least one processor in the nacelle or on the ground. For example, measurement data issuing from sensors, for example blade-orientation values, values representing the vibrations thereof, values indicating a battery charge state, or other, may be transmitted via a ring holder, to the processor, and conversely control data coming from the processor, for example messages for imposing a rotation angle on the blades, or other, can also be transferred via the ring holder.

The document WO 2015/079176 describes a system for the contactless transfer of data, that is to say integrating radio-frequency transmission means. This system has relatively few constraints in terms of maintenance.

It is envisaged having recourse to a wireless optical communication system, or OWC (optical wireless communications) in order to reduce the data transfer time between the sensors or actuators on the rotating part and the monitoring device on the fixed part. Nevertheless, there is a risk that communications may be affected by the environment, in particular the vibrations liable to lead to losses of alignment between the optical transmitter and receiver, thus disturbing the optical path, the light flow of the data transfer.

BRIEF SUMMARY OF THE INVENTION

There therefore exists a need for a data transfer system involving wireless optical communication between a fixed element and a rotating element that is more robust and more reliable.

A data transfer system with at least one channel between a rotating element and a fixed element by wireless optical communication is proposed, comprising, for each channel:

a rotating set of at least one rotating optical transmitter or receiver, mounted on and secured to the rotating element, a fixed set of at least one fixed optical receiver or transmitter, mounted on and secured to the fixed element, wherein one of the rotating set and the fixed set comprises a plurality of optical transmitters or receivers annularly distributed around the rotating element, the other one of the rotating set and the fixed set comprises at least one optical receiver or transmitter disposed substantially at the same height, along the rotation axis of the rotating element, as the plurality of optical transmitters or receivers annularly distributed.

The rotating set may comprise the plurality of optical transmitters or receivers annularly disposed, for example mounted directly on the rotating element, or on an annular support (in one or more parts) itself receiving the rotating element and secured to this rotating element.

The annular support may for example comprise two or more supports in an arc of a circle, thus allowing easier mounting on the rotating element.

Alternatively, the transmitters or receivers annularly disposed may be fixed in relation to the rotating element. It will be possible for example to make provision for mounting these transmitters or receivers on a support in the form of a ring with a diameter greater than the dimensions of a cross section of the rotating element in a plane normal to the rotation axis, surrounding the rotating element, but fixed. The transmitters or receivers are mounted on this support so as to have their transmission/reception cones oriented towards the rotating element.

The rotating receiver(s) or transmitter(s) may be mounted on the rotating element facing this element in the form of a ring.

A single channel, or a plurality of channels, in particular a plurality of uplink channels and a plurality of downlink channels, may be provided.

A small number, for example only one, two or five, of receiver(s) or transmitter(s) may be provided in the other one of the fixed set and rotating set, in which case this other set may have a relatively punctiform character (in the sense of spatially limited), or more. This other set may for example comprise a plurality of receivers or transmitters, distributed in an arc of a circle, for example so as to occupy an angular range between 1° and 270°, for example between 1° and 30°, advantageously between 1° and 15°, or between 30° and 270°, for example 5°, 10°, 25°, 90° or 125°, or annularly (in one or more parts). In the latter case, the system may comprise a pair of concentric rings.

The fixed and rotating sets are arranged so that, whatever the angular position of the rotating element, as applicable:

said at least one optical receiver of the other one of the rotating set and the fixed set receives optical signals emitted by at least one transmitter in said plurality of optical transmitters annularly distributed, or at least one receiver in said plurality of optical receivers annularly distributed receives optical signals emitted by at least one optical transmitter of the other one of the rotating set and the fixed set.

The system may advantageously further comprise processing means in communication with said at least one transmitter in the rotating set or fixed set as applicable.

These processing means may advantageously be arranged so as to generate, independently of the angular position of the rotating element, an electrical signal and to transmit, to said at least one transmitter, said electrical signals so that, if there is more than one transmitter in this set, these transmitters simultaneously transmit the same optical signal.

Thus this ring arrangement can make it possible to guarantee transmissions despite any vibration of the rotating element.

Furthermore, it is not necessary to take into account the angular position of the rotating element when the flows to be transmitted are generated, which may be particularly advantageous in applications for which this position is difficult to predict, such as wind turbines. It will also be possible to provide communication with a relatively high data rate.

The arrangement of the transmitters and receivers can be determined on the basis of the geometric laws of optics and taking into account the characteristics of the transmitters and receivers and the size thereof.

In order to choose the number of optical transmitters or receivers, it will be possible to take into account the form of the transmission and reception cones, the sensitivity of the receivers, the number and arrangement of transmitters or receivers in the other one of the fixed set and the rotating set, and to determine a number of transmitters or receivers for the plurality of transmitters or receivers annularly disposed (disposed in a ring) that is sufficiently high so that a regular annular arrangement of these transmitters or receivers ensures an optical signal transfer whatever the angular position of the rotating element.

In the case of transmitters in a ring, the transmissions are omnidirectional and relatively simple to control. The processing means can be arranged to transmit, to all the transmitters in said plurality of optical transmitters distributed in a ring, the same electrical signal so that these transmitters simultaneously transmit the same optical signal independently of the angular position of the rotating element.

In the case of receivers annularly disposed, the transmissions do not take into account the angular position of the rotating element, and a processing can be provided, for example an adding over all the receivers of the electrical signals issuing from the optical signals received by the receivers, so as to find a signal corresponding to the signal or signals measured by the receiver or receivers opposite, at the time of the optical transmission, the transmitter of the other one of the fixed set and the rotating set.

The system may comprise supplementary processing means, in communication, advantageously electrically connected, with the receivers in the fixed set or in the moving set.

When the receivers are annularly distributed, these supplementary processing means can be arranged to produce, independently of the angular position of the rotating element, an electrical signal corresponding to the electrical signal or signals measured by the receiver or receivers opposite, at the moment of optical transmission, the transmitter of the other one of the rotating set and the fixed set from the electrical signals measured by the receivers in said plurality of optical receivers annularly distributed.

These supplementary processing means may be arranged so as to transmit this electrical signal to another item of equipment secured to the element on which the receivers in a ring are mounted. It is thus possible to use an analogue or digital adding circuit.

The supplementary processing means may for example comprise a node connecting together conductive linear elements (wires or tracks for example) each connected moreover to a receiver. The electrical signals are thus added simply, by a single node among conductive linear elements disposed in parallel.

The optical signals are converted into electrical signals by conversion means integrated in the receivers. The receivers may for example comprise photodiodes, or the like.

The invention is not limited to a simple sum. It would be possible for example to provide a thresholding, only the signals above a threshold being kept for adding in order to avoid taking into account the signals issuing from receivers distant from the transmitter. In general, the invention is in no way limited by the way in which the electrical signal is produced according to the signals measured by the optical receivers, provided that this processing is independent of the angular position of the rotating element.

In the case of transmitters in a ring, the supplementary processing means, connected to this at least one optical receiver of the other one of the fixed set and the rotating set, may be arranged to produce an electrical signal from the electrical signal or signals measured by the optical receiver or receivers of this other one of the fixed set and the rotating set, and to transmit this electrical signal to another item of equipment secured to the equipment on which this other one of the fixed set and the rotating set is mounted.

The transmitters or receivers in the same set disposed in a ring may be disposed in a single row, or on two rows or more.

When the transmitters or receivers in the same ring are thus disposed on more than one row, it will be possible to provide angular offsets from one row to the other. This can make it possible to guarantee good reception of the signals whatever the angular position of the rotating element.

Advantageously, in the case of receivers (or transmitters) in the same ring disposed on N rows, N being greater than or equal to two, it will be possible to provide an offset from one row to another of the length (in the direction of the circumference of the ring) of a receiver (or transmitter, respectively), or of the length occupied by a receiver (or transmitter, respectively), divided by N. For example, in the case of two rows of optical transmitters, each transmitter occupying 4 millimetres of the circumference, an offset of 2 millimetres can be provided.

The data transfer system may comprise several pluralities of transmitters or receivers in a ring. Each plurality may correspond to a channel, but it is also possible to provide several pluralities in a ring for the same channel (hardware redundancy).

Advantageously at least two pluralities of transmitters or receivers can be provided, disposed at different heights, as well as at least two other corresponding fixed or rotating sets.

A plurality of transmitters and a plurality of receivers can be provided, disposed at different heights from one another. The communications can thus be bidirectional.

The system may also comprise
- a plurality of rotating optical transmitters, annularly distributed (i.e., in a ring) on the rotating element and secured to the rotating element, included in the rotating set for example,
- at least one fixed optical receiver mounted on and secured to the fixed element, disposed at the same height as the plurality of rotating optical transmitters, included in fixed set for example,
- a plurality of rotating optical receivers, annularly distributed on the rotating element and secured to the rotating element, at least one fixed optical transmitter mounted on and secured to the fixed element, disposed at the same height as the plurality of rotating optical receivers.

Advantageously, the plurality of transmitters and receivers disposed in a ring may be chosen and disposed so that the overlap of light of the transmission or reception cones over the whole of the circumference of the ring is greater than 30%, advantageously greater than 40%, advantageously greater than 50%. Thus the transmission can be assured even if a transmitter or receiver in this plurality of transmitters or receivers disposed in a ring is faulty.

In one embodiment, the processing means and/or the supplementary processing means may comprise digital means for processing the signal, for example one or more processors.

Advantageously, the plurality of receivers in one of the rotating set and the fixed set may be disposed in parallel, each receiver being connected to the associated conductive linear element. The plurality of conductive linear elements corresponding to this plurality of receivers may be disposed in parallel and be joined in a set of at least one node.

In the case of M nodes, M being greater than or equal to 2 and strictly less than the number of receivers in the ring, it will be possible for example to make provision for connecting, to the same node, all the receivers occupying an arc of a circle of 360°/M on the circumference. Each node may itself be connected to an input of digital processing means.

However, advantageously, only one node is provided for the plurality of receivers.

An input of digital means for processing the signal advantageously corresponds to each node in said set. This (or these where applicable) node may advantageously be upstream of the digital means for processing the signal. In other words, the receivers are electrically wired in parallel.

Adding of the measured electrical signals is thus particularly simple to carry out, and furthermore any phenomena of lack of synchrony are avoided, making it possible to gain in transmission rate. Furthermore, there is a gain in simplicity and ease of adaptation, in particular when the number of receivers changes.

In an advantageous embodiment, each conductive linear element directly connects the associated receiver to the node (corresponding in the case of a plurality of nodes). This can make it possible to avoid affecting the measured signals by delays liable to vary from one receiver to another, as could occur in the case of items of electronic equipment each disposed between the node and an associated receiver. Each item of equipment would introduce a delay and the dispersion between these delays would prevent providing communications with very high transmission rates.

Advantageously, when the other one of the rotating set and the fixed set comprises a plurality of receivers, it will be possible to make provision for disposing these receivers in parallel, each receiver being connected to an associated conductive linear element. The plurality of conductive linear elements corresponding to this plurality of receivers may be disposed in parallel and be joined in a node (or of course in a small number of nodes).

This node may advantageously be upstream of digital processing means and correspond to an input of these digital processing means.

In an advantageous embodiment, each conductive linear element directly connects the associated receiver to the node.

Advantageously, the plurality of transmitters of one of the rotating set and the fixed set is disposed in series. Thus it is possible to avoid any phenomena of lack of synchrony from one transmitter to another, making it possible to transmit data with very high rates. Furthermore, there is a gain in simplicity and ease of adaptation. For example, it is relatively easy to replace one set of transmitters in series with another (optionally having a different number of transmitters).

Advantageously, when the other one of the rotating set and the fixed set comprises a plurality of transmitters, it will be possible to make provision for disposing these transmitters in series.

It is possible to provide detection means arranged to detect a failure of a transmitter. These detection means may be upstream of the transmitters disposed in series, and comprise for example means for measuring the impedance of a loop comprising these transmitters in series.

In one embodiment, the detection means, for example supplementary processing means, are electrically connected to one or more receivers opposite a plurality of transmitters, and may be arranged so as to generate a message signalling transmitter failure in the case of non-reception of a signal, in particular when receivers disposed at a different height are actually receiving signals.

This is because, and in particular in the case of transmitters disposed in series, the failure of one transmitter may damage all the transmitters in the corresponding plurality of transmitters. Detection of this failure and signalling thereof can make it possible to take the appropriate measures, for example replacing an array of LEDs.

Advantageously, these supplementary processing means may be arranged also to transmit an angular position value of the rotating element at the moment of detection of the failure. This information can facilitate searches for the origin of the failure, in particular if the same angle is recorded for a plurality of failures. It will then be possible to presume that such a transmitter is regularly faulty on a given series of arrays of LEDs.

In one embodiment, means for detecting failure of receivers, for example integrated in the supplementary processing means, are arranged:

to carry out an adding over time of the signal or signals issuing from the node (or nodes), over a period of time corresponding to at least one degree of angular movement of the rotating element, advantageously to at least a half-period of rotation of the rotating element, for example over 50 ms, 1 second, 2 seconds or 3 seconds in the case of a rotation speed of 50 revolutions/minute, so as to obtain average measured values, in the case of a significant decrease in one of these average measured values with respect to the others, for example a decrease of more than 3% or 8%, for example when there are 20 or 10 receivers respectively, to generate a message as to suspicion of failure.

Thus, despite a possible absence of detection means (digital or analogue) connected directly to each receiver, it is still possible to detect any failures.

In a non-limitative embodiment, each average measured value is compared with a threshold, and it is considered that there is a significant decrease when one (or a plurality of consecutive average measured values) is below this threshold.

Advantageously, this threshold may depend on the number of detectors in the ring.

Advantageously, this threshold may depend on a measurement value that is predetermined or measured initially.

For example, the threshold may be chosen as the product of this initial value (corresponding to a situation of full functioning) and of (1-½Q), (1-⅔Q) or (1-⅘Q), Q being the number of receivers in the ring.

In a non-limitative embodiment, it will be possible to make the generation of the message as to suspicion of failure dependent on significant decreases reiterated at each period of rotation of the rotating element.

Advantageously, provision may be made, in particular in the case of generation of a message as to suspicion of failure, that:

(i) adding is carried out of the signal or signals issuing from the node (or nodes) over a time lying between around 100 periods of the optical signals (for example 0.1 µs in the case of optical communications at 1 GHz) and a time corresponding to an angular movement of twice the length (along the circumference of the ring) occupied by a receiver (for example 0.1 s in the case of an element rotating at 60 revolutions per minute and equipped with a ring of 20 receivers, so as to obtain an average measured value over a short window, (ii) there is associated with this measured value averaged over a short window with an angular position value of the rotating element during corresponding measurements, steps (i) and (ii) are reiterated and it is sought which angular position corresponds to a minimum of these measured values averaged over a short window.

These steps can be performed by means for detecting failure of the receivers, for example integrated in the supplementary processing means.

It is thus possible to identify the faulty receiver. In other words, it is sought to which angular position a reduction in the signal corresponds. This angular position value can be transmitted for purposes of replacement of the corresponding receiver.

Such a method may prove to be particularly advantageous in the case of receivers in parallel, connected to a node itself connected to an FPGA input for example, since it makes it possible to save on detection means dedicated to each node and to avoid any delays that would be introduced.

These steps (i), (ii), the reiteration thereof and the search for a minimum may be carried out for example only in the case of the generation of a message as to suspicion of failure.

However, alternatively, it will be possible to make provision for executing them even in the absence of such a message. The detection of receiver failures could for example be carried out by performing steps (i) and (ii) in a reiterated fashion, for example every ms or µs in the case of a short window of 1 to 10 µs. In the case of the detection of a significant minimum, a message signalling a failure is generated directly for the angle (or a range of angles) corresponding to this minimum.

Advantageously, the processing means and/or the supplementary processing means may respectively comprise means for connection to a plurality of groups of at least one cabled channel, for receiving a plurality of respective data flows, each flow issuing from a corresponding appliance, for example input buses, input ports, or the like. Each appliance may be installed on the fixed or rotating element as applicable.

The digital signal processing means may be arranged to produce a flow to be transmitted to a set of at least one transmitter electrically connected to said digital processing means, with a view to an optical transmission, according to the data flows received.

For example, the digital signal processing means may be arranged to allocate to each flow received a priority parameter value and, in the case of the concomitant reception of a plurality of flows, to compare the values of the priority parameter associated with the flows received and to transmit, as a priority, to the optical transmitter or transmitters, the flow associated with the value of the priority parameter corresponding to the highest degree of priority.

The system may thus be installed in an assembly designed by third parties, with a variable number of sources and/or communication protocols already in place.

Provision can furthermore be made for the digital signal processing means to be programmed so as to extract useful data from the flows received, and to encapsulate the useful data thus extracted in frames in accordance with a wireless optical communication protocol.

Advantageously, the processing means may be programmed to process the data to be transmitted, for example the extracted useful data, so that the data corresponding to the electrical signal generated has redundancy (for example an error correcting coding, for example Reed-Salomon, or other).

The supplementary processing means may then be programmed to decode the data corresponding to the electrical signals received in order to ensure the integrity of the data. This can make it possible to detect and/or mitigate any failures.

The supplementary processing means may then be programmed to carry out diagnoses from any detections.

The processing means and/or the supplementary processing means may be programmed to establish degraded operating modes, guaranteeing minimum service of the communication system.

The processing means and/or the digital processing means may for example comprise an FPGA (field-programmable gate array) or the like.

In one embodiment, in which the system comprises at least two pluralities of transmitters or receivers in a ring, each set of transmitters sends optical signals with an associated wavelength.

Alternatively, when the system comprises, for each channel among at least two channels, at least two pluralities of transmitters or receivers in a ring for this channel, all the transmitters corresponding to the same channel may send optical signals with an associated wavelength.

The invention is in no way limited by these choices of distinctive wavelengths. It would be entirely possible to make provision for using the same wavelengths for uplink and downlink communications and/or from one channel to another (or from one plurality in a ring to another).

In one embodiment, the system may comprise filtering means (optical or electronic). This can make it possible to eliminate irrelevant signals.

In particular, when the system comprises at least two pluralities of transmitters or receivers in a ring and uses at least two different wavelengths, the system may comprise filtering means around each of these wavelengths.

The filtering means may for example comprise a coloured glass, or analogue or digital processing means.

Provision may furthermore be made for a shield around the transmitter or transmitters in order to partly absorb any surplus light.

The system described above may further comprise a housing for receiving the fixed and rotating sets. This housing may advantageously have an absorbent cladding.

The data transfer system may be arranged so as to be installed in a wind turbine, or other.

The invention is in no way limited by the type of OWC used. Provision may for example be made for infrared wireless communication, by Li-Fi, by VLC (visible light communications), or other. The communications may for example be in accordance with the IRDA, IEEE 802.15.7 or other standards.

The optical transmitters may for example comprise diodes, for example light emitting diodes or LEDs, laser, or the like.

The optical receivers may comprise photodiodes, or image sensors, for example CMOS (complementary metal-oxide semiconductor) sensors.

An assembly comprising a rotating element, a fixed element and the data transfer system described above is furthermore proposed. This assembly may be integrated in wind turbine, or not.

A wind turbine comprising such assembly is also proposed. The rotating element may comprise the shaft of the rotating part, be secured to the shaft or be moved by this shaft.

The frequencies used for the optical communications may be above 10 MHz, advantageously above 100 MHz.

The frequencies used for the optical communications may be in a range between 1 megahertz and 60 gigahertz, advantageously between 100 megahertz and 10 gigahertz, for example around 1 gigahertz.

The transmission rates used may be greater than 5 megabits per second, advantageously greater than 100 megabits per second.

The rates used may for example be in a range between 100 kilobits per second and 20 gigabits, advantageously between 50 megabits per second and 5 gigabits per second, for example around 1 gigabit per second.

Transmission in baseband may for example be provided.

A coding, for example a Manchester coding or other, may be provided.

The invention is not limited by the choice of any particular modulation. Use could be made of an OOK (on-off keying) modulation, or other.

BRIEF DESCRIPTION OF THE DRAWINGS

The invention will be best described with reference to the following figures, which depict an embodiment given by way of non-limitative example.

DETAILED DESCRIPTION OF THE PREFERRED EMBODIMENTS

Identical references can be used from one figure to another to designate identical or similar elements.

Figure 1:
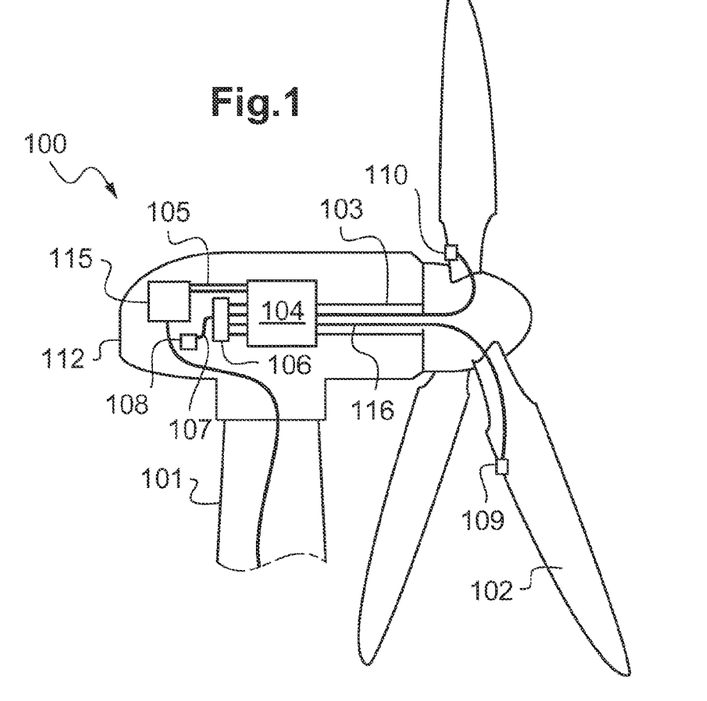
FIG. 1 shows schematically an overall example of a wind turbine according to one embodiment of the invention.

With reference to FIG. 1, a wind turbine 100 comprises a mast 101, a nacelle 112 and blades 102 secured to a so-called slow shaft 103.

A multiplier 104 converts the rotation movement of the slow shaft 103 into a faster movement of a so-called fast shaft 105.

A generator 115 generates current from the movement of this fast shaft 105.

The wind turbine is equipped with sensors, for example vibration sensors or other, only one of which 109 is shown here for reasons of clarity. A monitor 108, comprising for example one or more processors, receives signals issuing from these sensors and controls actuators accordingly, for example a motor 110 for modifying the orientation of the blades 102.

The appliances 109, 110 are thus secured to the blades, while the processor remains fixed.

Cables 116 connected to the sensors or to the actuators are installed inside the slow shaft 103. For more clarity, only two cables have been shown, but in reality a group of one or more cables connecting this appliance to a signal transfer system or STS, depicted schematically and referenced 106, corresponds to each appliance 109, 110.

The STS 106 is situated in the vicinity of the multiplier 104 and coupled mechanically to the slow shaft 103. The STS 106 is connected to the monitor by a group of one or more cable routes, only one of which 107 is shown here for reasons of clarity.

Supplementary cables, not shown, make it possible to transfer power between the STS 106 and the blade-orientation motor 110.

Figure 2:
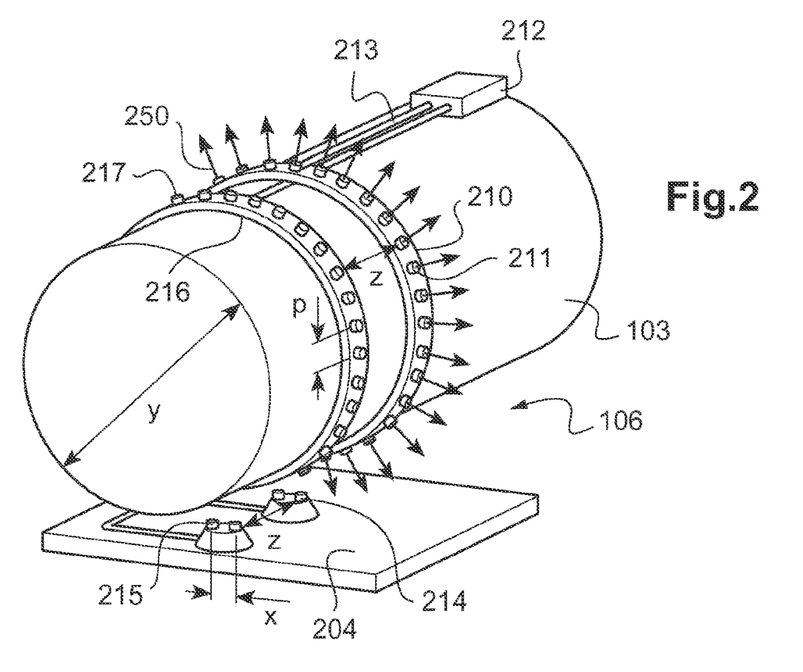
FIG. 2 shows schematically and in perspective an example of a data transfer system according to one embodiment of the invention.

With reference to FIG. 2, the transfer system 106 is depicted. This system 106 makes it possible to transfer data between a rotating element, here the slow shaft 103, and a fixed element 204, here an element secured to the nacelle.

The slow shaft 103 is subjected to vibrations, and to thermal variations over a range from −40° C. to +100° C.

The system 106 depicted defines a downlink communication channel, for transferring signals from the fixed part 204 to the shaft 103, and an uplink channel for transferring signals from the slow shaft 103 to a processor installed in the nacelle.

The system comprises an array 210 of several tens of LEDs 211 mounted around the slow shaft 103, so as to form a ring of transmitters 211, in order to provide, with photodiodes 214, the communications on the uplink channel. In a manner known per se, each LED 211 integrates optical-electrical conversion means and receives an electrical signal that it transforms into an optical signal.

A processing device 212, for example an FPGA, produces an electrical signal from signals issuing from sensors (not shown in FIG. 2) on the rotating part of the wind turbine. This electrical signal is transmitted by one (or more) conductive wires 213 to all the LEDs 211, which then simultaneously transmit the same optical signal.

The optical transmissions on this uplink channel are therefore omnidirectional, as depicted symbolically by the arrows 250.

In a manner known per se, use may be made of Manchester coding, an OOK (on-off keying) modulation, or the like. The transmission rates may for example be 1 gigabit per second, and the optical carrier frequency 5 gigahertz for example.

In this embodiment, two optical receivers 214, for example photodiodes, are disposed at the same height, in the direction of rotation of the slow shaft 103, as the array 210.

The array 210 being in a plane normal to the rotation direction, the photodiodes 214 are in the plane defined by this array 210.

Figure 4:
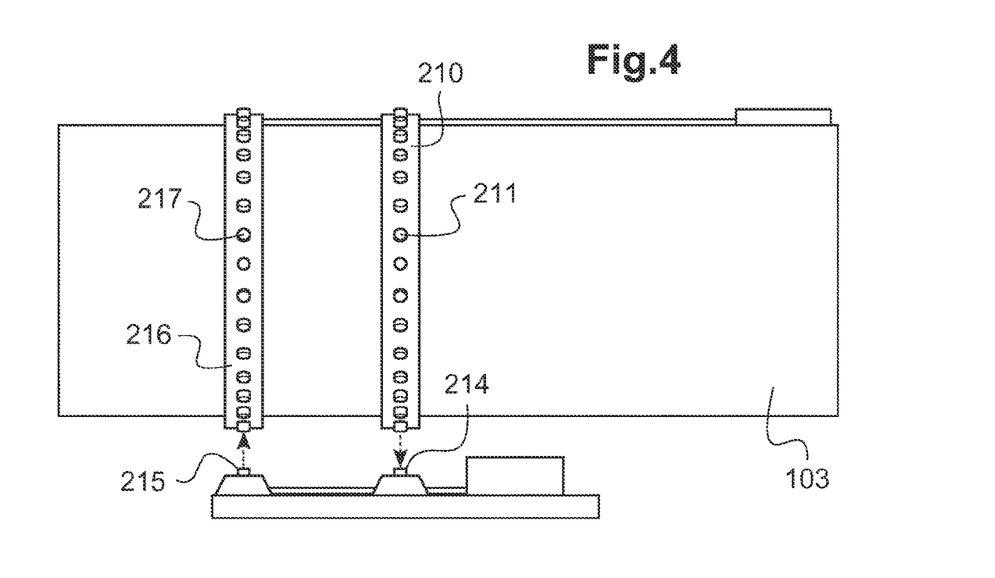
FIG. 4 is a side view of the system in FIG. 2.

These photodiodes 214 receive the optical signals from the transmitters 211 facing them, as illustrated by FIG. 4. The rotation speed of the shaft 103 may be variable, and possibly high, but, since the optical transmissions are omni-directional and the speed of light considerably higher than the speed of the shaft, the absence of any a priori knowledge of the angular position of the shaft has a trifling influence on the quality of the transmission.

The electrical signals measured by the photodiodes 214 are added together, and the resulting electrical signal is sent to a processor installed in the fixed part of the wind turbine, for example an FPGA.

Concerning the downlink channel, two LEDs 215 secured to the fixed part 204 are disposed facing a second array 216 of photodiodes 217.

A processor, not shown, for example the FPGA of the fixed part, sends an electrical signal to be transmitted to these LEDs 215, and at least some of the photodiodes 217, namely those that are facing these LEDs 215, then receive optical signals.

Downstream of the photodiodes 217, on the rotating shaft, a processor, not shown, for example integrated in the FPGA 212, adds all the electrical signals issuing from the photodiodes 217 so as to reconstitute the electrical signal sent to the LEDs 215.

Figure 9:
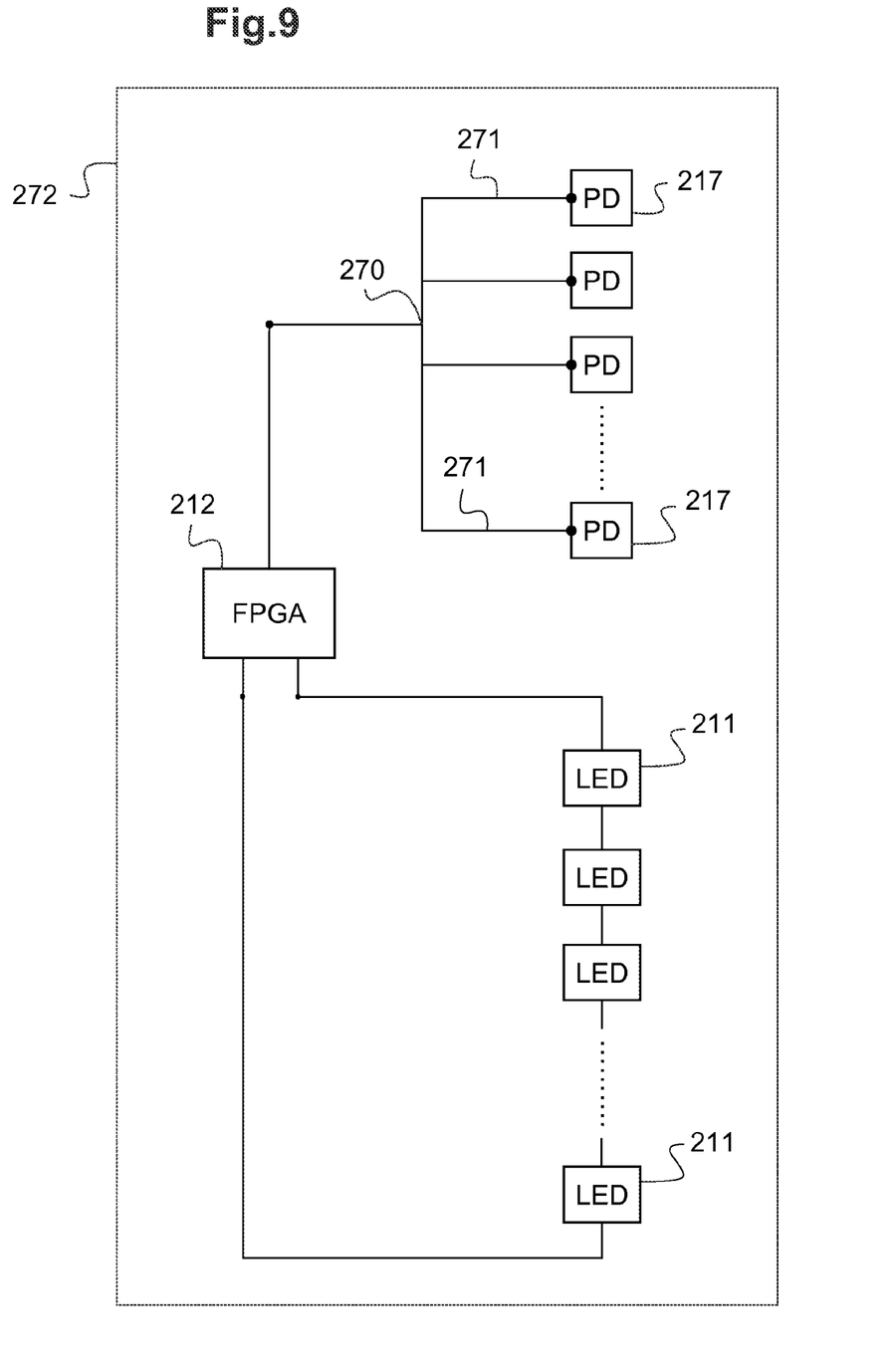
FIG. 9 shows schematically a fixed element or a rotating element of an example of a system according to one embodiment of the invention.

However, in an alternative embodiment, provision can be made for carrying out this adding by analogue means, advantageously by a simple wiring in parallel, as in the embodiment in FIG. 9.

The number of LEDs 211 and photodiodes 217 will be chosen according to the diameter y of the shaft (FIGS. 2 and 3), the number of photodiodes 214 and LEDs 215, respectively opposite the corresponding arrays, and the optical characteristics of these components 211, 217, 214, 215.

Figures 5, 6:
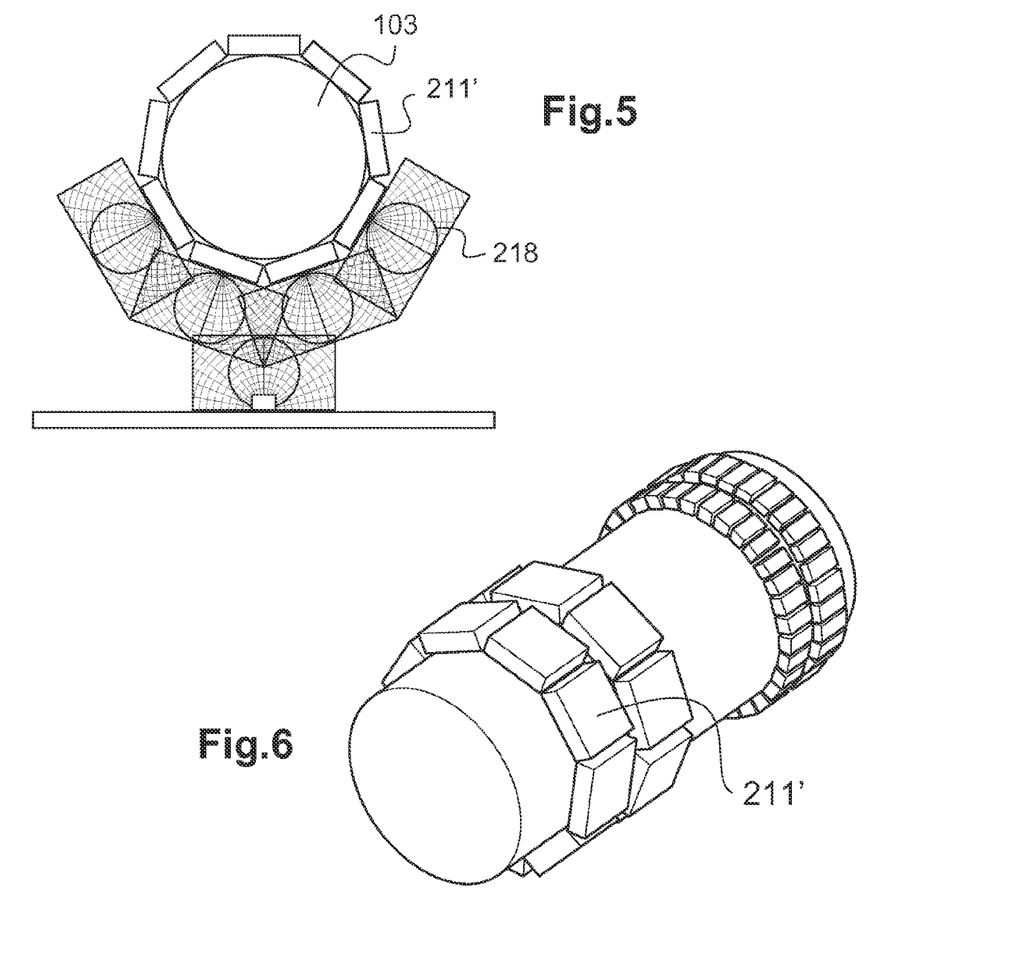
FIG. 5 shows the emission cones of transmitters in a ring mounted on a rotating shaft.
FIG. 6 shows schematically a part of an example of a system according to another embodiment of the invention.

If, as shown in FIG. 5, LEDs 211' have a relatively inextensive transmission cone 218 and the number of LEDs 211' is small, there is a risk that the transfer of data may be seriously limited or wiped out for certain angular positions of the shaft 103.

Figure 3:
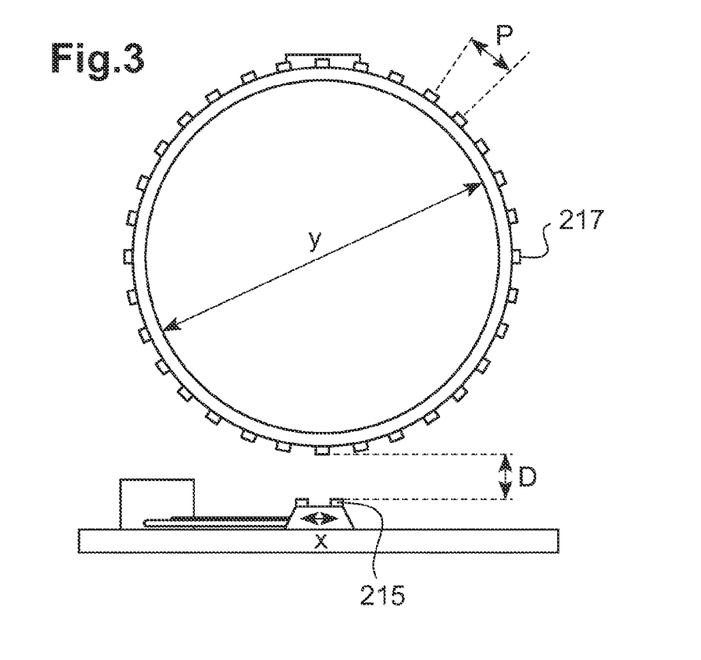
FIG. 3 is a view in cross section of the system in FIG. 2.

Thus, and in particular if it is not possible to act on the distance p between LEDs as in FIGS. 2 to 4 because of the dimensions of the LEDs 211', provision can be made for arranging these LEDs 211' in two rows, with offsets, as illustrated by FIG. 6.

Provision may also be made to have recourse to a first wavelength for the communications on the uplink channel and a second wavelength, different from the first, for communications on the downlink channel.

The processing means downstream of the photodiodes may integrate digital filters each centred around the expected wavelength.

For a slow shaft 103 having a diameter y between 10 and 20 millimetres, for example 15 millimetres, provision can be made for separating the arrays 210, 216 by a height z of around one millimetre or one centimetre for example; the distance p between two transmitters or receivers on the same array may for example be between 0.05 mm and 0.3 mm, for example 0.1 or 0.2 mm; the distance x between the fixed transmitters 215 or the fixed receivers 214 may be around one millimetre or other; finally, the distance D between a fixed set 214, 215 and the corresponding rotating set 210, 216 may for example be around one millimetre or one centimetre, for example 2 or 3 millimetres.

Figure 8:
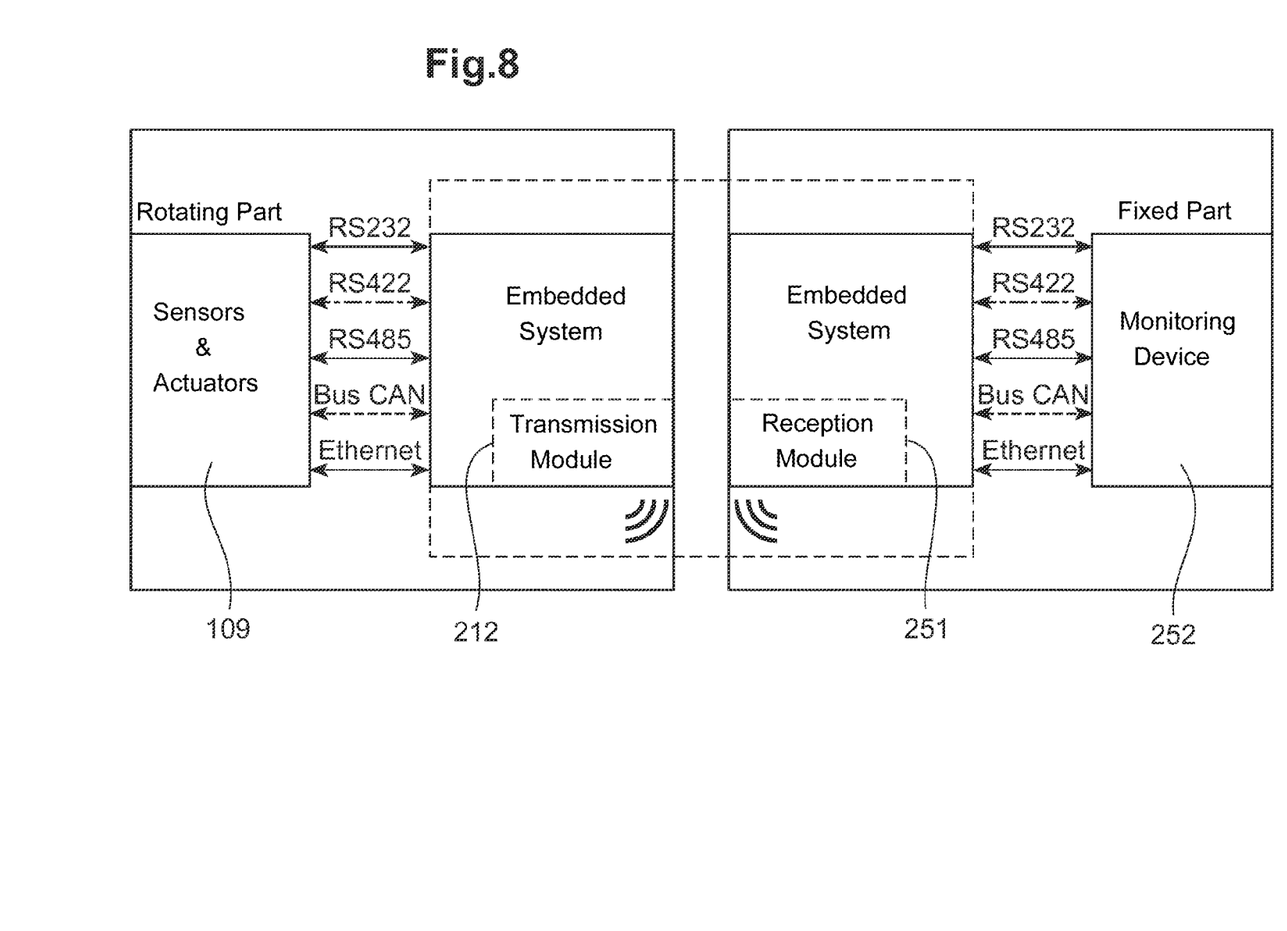
FIG. 8 is a block representation of an example of a system according to one embodiment of the invention.

With reference to FIG. 8, this depicts a plurality of channels, with various protocols (Ethernet, RS232, etc.) for collecting measurements issuing from the sensors 109 on the rotating part of the wind turbine.

The invention is not limited by the communication protocols implemented on the cabled channels. Mention can be made for example of RS232, RS422, RS485, CAN bus (controller area network), Ethernet, ProfiBus (Process Field Bus), Modbus and Interbus.

A group of channel or channels comprising a defined number of channels, for example three channels for the RS232 protocol, two or four channels for the RS485 protocol, two channels for the CAN bus and five channels for Ethernet, is associated with a given protocol.

A transmission module, for example the FPGA 212, receives these flows and allocates a priority parameter value to each flow received. For example, the data issuing from a CAN bus can be considered to have lower priority than Ethernet data.

In the event of concomitant reception of a plurality of flows, the FPGA 212 compares the values of the priority parameter associated with the flows received and transmits as a priority the optical transmitters of the array 210 the flow associated with the value of the priority parameter corresponding to the highest degree of priority.

The data received by the FPGA are structured in messages, with various fields (identifying the protocol, date, etc.). The FPGA extracts the useful data (measured values, identifier of the sensor, etc.) from the data received and encapsulates these useful data in new messages, in accordance with a wireless communication protocol, for example Li-Fi.

The electrical signal thus generated is sent in parallel to all the transmitters of the array 210.

However, in an alternative embodiment, provision can be made for arranging the transmitters of the array 210 in series, as illustrated in FIG. 9.

On the fixed part, a photodiode (or a plurality) facing the array of transmitters receives an optical signal and transmits accordingly an electrical signal received to a digital to analogue converter upstream of an FPGA 251 installed on the fixed part.

This FPGA 251 extracts the useful data from the digital signal issuing from the photodiode, encapsulates them in accordance with a protocol chosen according for example to a sensor identifier and sends them to a monitoring device 252 using a flow corresponding to the chosen protocol.

The monitoring device may for example comprise a processor connected to a computer on the ground, or in communication with a radio-frequency communication module for communication with the ground or with remote equipment.

This processor may receive or produce, from simply signals issuing from the sensors 109, a control signal intended for actuators present on the rotating part.

This control signal is then transmitted using an LED facing an array of photodiodes.

Figure 7:
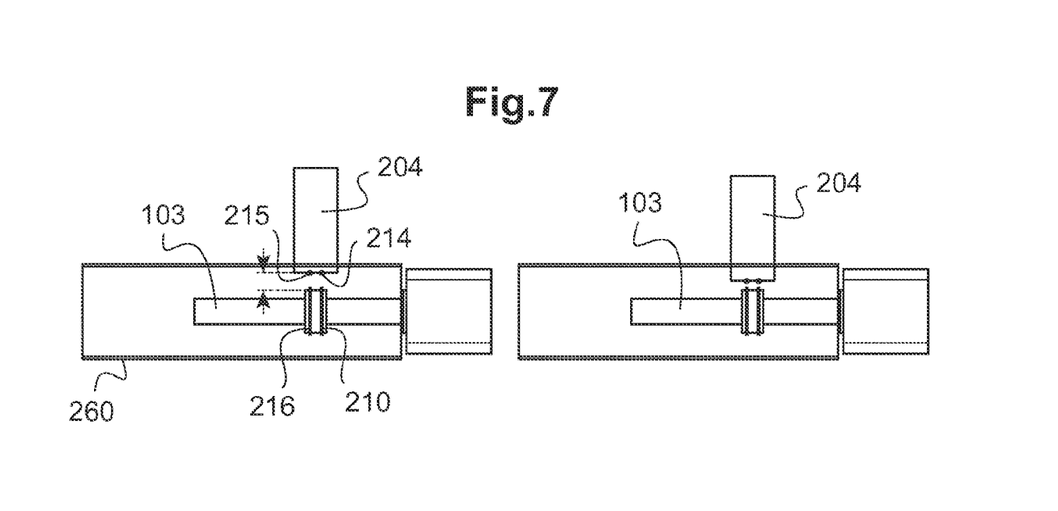
FIG. 7 shows schematically two configurations of an example of a system according to one embodiment of the invention.

With reference to FIG. 7, a fixed receiver 214 and a fixed transmitter 215 are mounted on a fixed part 204, facing respectively an array 210 of transmitters and an array 216 of receivers mounted on a shaft 103.

The rotating shaft 103 is partly accommodated in a housing 260, fixed in relation to the shaft.

The fixed part 204 is partly accommodated in the housing 260.

The housing 260 defines an opening for the shaft 103 to pass, sufficiently extensive so as not to interfere with the rotation of the shaft 103, and another opening for the fixed part to pass. This other opening is sufficiently extensive to allow a movement of the fixed part towards the shaft, so as to reduce the distance D if necessary, as illustrated in FIG. 7.

The interior of the housing 260 is covered with an absorbent cladding, in order to avoid any reverberation of the light signals and the stray signals resulting from such reverberations.

With reference to FIG. 9, a rotating (or fixed) element 272 comprises a plurality of optical receivers 217 disposed in a ring, as well as a plurality of transmitters 211 also disposed in a ring, the two rings being distant from one another.

This annular arrangement has not been repeated in FIG. 9 in order to facilitate reading thereof.

It will however be understood that the transmitters 211 are disposed in series and that an FPGA 212 sends a signal transmitted to all the transmitters 211 in series.

The receivers 217 are wired in parallel, each receiver 217 being connected to a corresponding wire 271.

The wires 217 join in a node 270. For each of the receivers, no component is installed between this receiver and the node. Any delays that might be caused by low-pass filters or other components are thus avoided.

The node 270 is itself connected to an input of the FPGA 212. The FPGA 212 therefore receives only one signal, resulting from an adding on all of the receivers of the signals of each of these receivers.

The invention claimed is:

1. A system for transferring data with at least one channel between a rotating element and a fixed element by wireless optical communication, the system comprising, for each channel:
   a rotating set of at least one rotating optical transmitter or receiver, mounted on and secured to the rotating element;
   a fixed set of at least one fixed optical receiver or transmitter, mounted on and secured to the fixed element; and
   a processor in communication with said at least one transmitter of the rotating set or of the fixed set,
   wherein one of the rotating set and the fixed set comprises a plurality of optical transmitters or receivers distributed annularly around the rotating element,
   the other one of the rotating set and the fixed set comprises at least one optical receiver or transmitter disposed substantially at the same height, along a rotation axis of the rotating element, as the plurality of optical transmitters or receivers distributed annularly around the rotating element,
   the fixed and rotating sets are disposed so that, at any angular position of the rotating element, said at least one optical receiver of the other one of the rotating set and the fixed set receives optical signals transmitted by at least one transmitter in said plurality of optical transmitters distributed annularly, or at least one receiver of said plurality of optical receivers distributed annularly receives optical signals transmitted by at least one optical transmitter of the other one of the rotating set and the fixed set,
   the processor is configured to generate an electrical signal independently of the angular position of the rotating element, and to transmit said electrical signal to said at least one transmitter in the rotating set or the fixed set so that, when there are at least two transmitters in the rotating set or the fixed set, the at least two transmitters simultaneously transmit the same optical signal, and one of the rotating set and the fixed set comprises a plurality of optical transmitters installed in series.

2. The data transfer system according to claim 1, wherein the plurality of transmitters or receivers disposed annularly the rotating element are chosen and disposed so that an overlap of light from transmission and reception current is greater than 30% over an entire circumference of the ring.

3. The data transfer system according to claim 1, wherein the rotating set comprises a plurality of rotating optical transmitters, distributed annularly on the rotating element and secured to the rotating element, and
   the fixed set comprises at least one fixed optical receiver mounted on and secured to the fixed element, disposed at the same height as the plurality of rotating optical transmitters.

4. The data transfer system according to claim 3, further comprising
   a plurality of rotating optical receivers distributed annularly on the rotating element and secured to the rotating element, and
   at least one fixed optical transmitter mounted on and secured to the fixed element, disposed at the same height as the plurality of rotating optical receivers.

5. The data transfer system according to claim 4, wherein the transmitters in the plurality of rotating optical transmitters distributed annularly transmit at a wavelength different from a wavelength of the at least one fixed optical transmitter.

6. The data transfer system according to claim 1, wherein the processor comprises a digital signal processor, and a connection system configured to connect to a plurality of groups of at least one cable channel, to receive a plurality of respective data flows, each flow issuing from a corresponding appliance.

7. The data transfer system according to claim 6, wherein the digital signal processor is configured to allocate a priority parameter value to each flow received, and, in the event of concomitant reception of a plurality of flows, to compare the values of the priority parameter associated with the flows received and to transmit as a priority, to the optical transmitter or transmitters, the flow associated with the value of the corresponding priority parameter with the highest degree of priority.

8. The data transfer system according to claim 1, further comprising a detector electrically connected to one or more receivers opposite the plurality of optical transmitters in series, said detector being configured to generate a transmitter fault signaling message in the event of non-reception of a signal.

9. The data transfer system according to claim 1, wherein one of the rotating set and the fixed set comprises a plurality of receivers disposed in parallel, each receiver being connected to an associated conductive linear element,
   the plurality of conductive linear elements corresponding to the plurality of receivers disposed in parallel is disposed in parallel and join in a set of at least one node, and
   an input of a digital signal processor corresponds to each of the at least one node in said set.

10. The data transfer system according to claim 9, further comprising a fault detector configured to detect a fault in the receivers, the fault detector being configured to carry out an adding over time of one or more signal issuing from the at least one node, over a period of time corresponding to at least one degree of angular movement of the rotating element, to obtain average measured values, and being configured to generate a fault suspicion message in the event of a significant decrease in one of the average measured values compared with others of the average measured values.

11. The data transfer system according to claim 9, further comprising a detector configured to detect a failure of the receivers, the detector being configured, when a fault suspicion message is generated:
   (i) to carry out an adding of at least one signal issuing from the at least one node over a time lying between around 100 periods of the optical signals and a time corresponding to an angular movement of twice a length, along a circumference of the ring occupied by a receiver, to obtain a measured value averaged over a short window,
   (ii) to associate, with the measured value averaged over a window of time, with an angular position value of the rotating element during corresponding measurements, and
   to reiterate the adding and the associating and to seek an angular position corresponding to a minimum of the measured values averaged over a window of time.

12. The data transfer system according to claim 1, wherein the plurality of optical transmitters or receivers distributed distributed annularly around the rotating element is disposed in a plurality of rows of transmitters or receivers offset with respect to each other.

13. The data transfer system according to claim 1, wherein the wireless optical communications take place by Li-Fi.

14. An assembly comprising:
   the rotating element;
   the fixed element; and
   the data transfer system according to claim 1.

15. A wind turbine comprising:
   the assembly according to claim 14.

16. The data transfer system according to claim 2, wherein the rotating set comprises a plurality of rotating optical transmitters, distributed annularly on the rotating element and secured to the rotating element, and
   the fixed set comprises at least one fixed optical receiver mounted on and secured to the fixed element, disposed at the same height as the plurality of rotating optical transmitters.

17. The data transfer system according to claim 2, wherein the processor comprises a digital signal, and a connection system configured to connect to a plurality of groups of at least one cable channel, to receive a plurality of respective data flows, each flow issuing from a corresponding appliance.

18. The data transfer system according to claim 3, wherein the processor comprises a digital signal processor, and a connection system configured to connect to a plurality of groups of at least one cable channel, to receive a plurality of respective data flows, each flow issuing from a corresponding appliance.

19. The data transfer system according to claim 4, wherein the processor comprises a digital signal processor, and a connection system configured to connect to a plurality of groups of at least one cable channel, to receive a plurality of respective data flows, each flow issuing from a corresponding appliance.

20. A system for transferring data with at least one channel between a rotating element and a fixed element by wireless optical communication, the system comprising, for each channel:
   a rotating set of at least one rotating optical transmitter or receiver, mounted on and secured to the rotating element;
   a fixed set of at least one fixed optical receiver or transmitter, mounted on and secured to the fixed element;
   a processor in communication with said at least one transmitter of the rotating set or of the fixed set,
   wherein one of the rotating set and the fixed set comprises a plurality of optical transmitters or receivers distributed annularly around the rotating element,
   the other one of the rotating set and the fixed set comprises at least one optical receiver or transmitter disposed substantially at the same height, along a rotation axis of the rotating element, as the plurality of optical transmitters or receivers distributed annularly around the rotating element,
   the fixed and rotating sets are disposed so that, at any angular position of the rotating element, said at least one optical receiver of the other one of the rotating set and the fixed set receives optical signals transmitted by at least one transmitter in said plurality of optical transmitters distributed annularly, or at least one receiver of said plurality of optical receivers distributed annularly receives optical signals transmitted by at least one optical transmitter of the other one of the rotating set and the fixed set,
   the processor is configured to generate an electrical signal independently of the angular position of the rotating element, and to transmit said electrical signal to said at least one transmitter in the rotating set or the fixed set so that, when there is at least two transmitters in the rotating set or the fixed set, the at least two transmitters simultaneously transmit the same optical signal,
   one of the rotating set and the fixed set comprises a plurality of receivers disposed in parallel, each receiver being connected to an associated conductive linear element,
   the plurality of conductive linear elements corresponding to the plurality of receivers disposed in parallel is disposed in parallel and join in a set of at least one node,
   an input of a digital signal processor corresponds to each of the at least one node in said set, and
   the system further comprises a fault detector configured to detect a fault in the receivers, the fault detector being configured to carry out an adding over time of one or more signal issuing from the at least one node, over a period of time corresponding to at least one degree of angular movement of the rotating element, to obtain average measured values, and being configured to generate a fault suspicion message in the event of a significant decrease in one of the average measured values compared with others of the average measured values.

21. A system for transferring data with at least one channel between a rotating element and a fixed element by wireless optical communication, the system comprising, for each channel:
   a rotating set of at least one rotating optical transmitter or receiver, mounted on and secured to the rotating element;
   a fixed set of at least one fixed optical receiver or transmitter, mounted on and secured to the fixed element;
   a processor in communication with said at least one transmitter of the rotating set or of the fixed set, wherein one of the rotating set and the fixed set comprises a plurality of optical transmitters or receivers distributed annularly around the rotating element, the other one of the rotating set and the fixed set comprises at least one optical receiver or transmitter disposed substantially at the same height, along a rotation axis of the rotating element, as the plurality of optical transmitters or receivers distributed annularly around the rotating element, the fixed and rotating sets are disposed so that, at any angular position of the rotating element, said at least one optical receiver of the other one of the rotating set and the fixed set receives optical signals transmitted by at least one transmitter in said plurality of optical transmitters distributed annularly, or at least one receiver of said plurality of optical receivers distributed annularly receives optical signals transmitted by at least one optical transmitter of the other one of the rotating set and the fixed set, the processor is configured to generate an electrical signal independently of the angular position of the rotating element, and to transmit said electrical signal to said at least one transmitter in the rotating set or the fixed set so that, when there is at least two transmitters in the rotating set or the fixed set, the at least two transmitters simultaneously transmit the same optical signal, one of the rotating set and the fixed set comprises a plurality of receivers disposed in parallel, each receiver being connected to an associated conductive linear element, the plurality of conductive linear elements corresponding to the plurality of receivers disposed in parallel is disposed in parallel and join in a set of at least one node, an input of a digital signal processor corresponds to each of the at least one node in said set, and the system further comprises a detector configured to detect a failure of the receivers, the detector being configured, when a fault suspicion message is generated:

(i) to carry out an adding of at least one signal issuing from the at least one node over a time lying between around 100 periods of the optical signals and a time corresponding to an angular movement of twice a length, along a circumference of the ring occupied by a receiver, to obtain a measured value averaged over a short window, (ii) to associate, with the measured value averaged over a window of time, with an angular position value of the rotating element during corresponding measurements, and to reiterate the adding and the associating and to seek an angular position corresponding to a minimum of the measured values averaged over a window of time.

* * * * *